MULTIPLE STAGE D.C. SIGNAL CONTROL DEVICE

Filed Aug. 14, 1963 3 Sheets-Sheet 1

Yasuo Segawa
INVENTOR.

BY George B. Oujevolk
Attorney

MULTIPLE STAGE D.C. SIGNAL CONTROL DEVICE

Filed Aug. 14, 1963

Yasuo Segawa
INVENTOR.

BY George B. Oujevolk
Attorney

Yasuo Segawa
INVENTOR.
BY George B. Oujevolk
Attorney

United States Patent Office 3,264,551
Patented August 2, 1966

3,264,551
MULTIPLE STAGE D.C. SIGNAL CONTROL DEVICE

Yasuo Segawa, Meguro-ku, Tokyo, Japan, assignor to Tokyo Shibaura Electric Co., Ltd., Kawasaki-shi, Japan, a corporation of Japan Filed Aug. 14, 1963, Ser. No. 302,099
Claims priority, application Japan, Aug. 16, 1962, 37/33,960
3 Claims. (Cl. 323—74)

This invention relates to a multiple stage D.C. signal control device adapted to smoothly control the level of a D.C. control signal.

According to one method of producing a variable D.C. signal a pair of variable resistors are connected in parallel with a source of direct current. These resistors are provided with movable contacts or slidable arms which are moved in unison and a plurality of switch contacts are provided to derive an output voltage which is the average value of the voltages at said slidable arms. As the slidable arms are moved in unison the output voltage varies gradually but does not vary linearly but along a V shaped curve. Such varying output voltage is not suitable for use in various applications including dimmers.

Accordingly, it is the object of this invention to provide an improved D.C. signal control device which can produce an output signal which varies linearly and smoothly.

Briefly stated the preferred embodiment of this invention comprises first and second D.C. sources with terminals, first and second variable resistors, each connected in parallel with said first and second D.C. sources, a first D.C. source bus supplied with the output voltage of any one of terminals of said first and second D.C. sources other than a common junction therebetween, a second D.C. source bus supplied with the output voltage of a slidable arm of said first variable resistor, a third D.C. source bus supplied with the output voltage of the slidable arm of said second variable resistor, a plurality of D.C. signal busses, two sets of switches, means to control said switches to selectively apply voltages of said first and second D.C. source busses to a selected one of said D.C. signal busses, one or more level setting variable resistors with one end connected to a selected one of said D.C. signal busses and the other end connected to a common junction between the two D.C. sources, and a pair of D.C. level control busses each connected to the movable arm of said level setting variable resistor through a pair of rectifier elements of opposite polarities.

While the specification concludes with claims particularly pointing out and distinctly claiming the subject matter which are regarded as this invention, it is believed that the invention will be better understood from the following description taken in connection with the accompanying drawings, in which FIG. 1 shows an electrical connection diagram of the prior art for a multiple stage D.C. signal control device;

Figure 1:
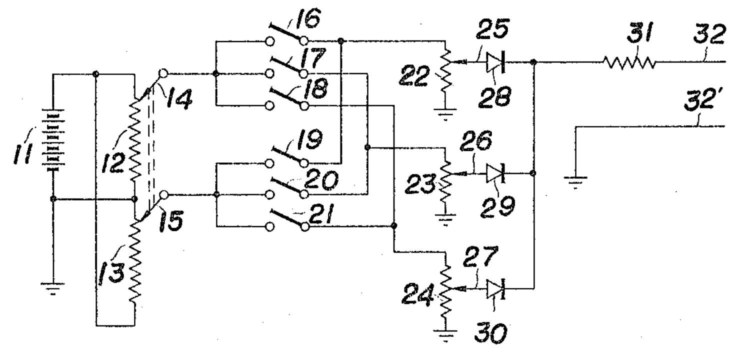
F I G. 1 PRIOR ART

Referring now to the accompanying drawings, there is shown in FIG. 1 a typical prior art circuit to provide quick or gradual change in D.C. signal levels. More particularly, a pair of variable resistors 12 and 13 are connected in parallel across a D.C. source indicated as a battery 11.

Each of the movable contacts or slidable arms 14 and 15 of the variable resistors 12 and 13 is respectively connected to the left side of each of the two pairs of switch contacts 16, 17 and 18 and 19, 20 and 21. Corresponding pairs of the right hand side of these switch contacts 16, 19; 17, 20 and 18, 21 are respectively connected to one end of another set of variable resistors 22, 23 and 24. The other ends of these variable resistors are grounded or connected to the negative terminal of the battery 11 while the movable contacts 25, 26 and 27 thereof which have been preset at a predetermined resistance value are connected to one input terminal 32 of the controlled member, not shown, via rectifier elements such as diodes 28, 29 and 30 and a common resistance 31, the other input terminal 32' being grounded.

Figure 2:
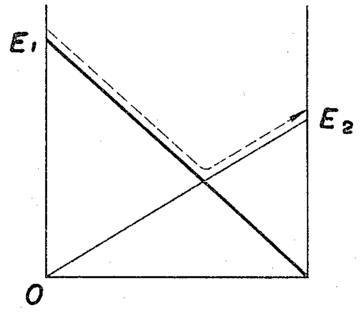
F I G. 2 PRIOR ART
FIG. 2 shows voltage curves to illustrate gradual change of the D.C. signal level in the circuit shown in FIG. 1.

While such a prior art arrangement can produce quick and gradual changes in the levels of the output D.C. signals it is not perfectly satisfactory in providing gradually changing signals. For example, if it is assumed that set voltages of signal levels are $E_1$ and $E_2$, and that these voltages are set by variable resistors 22 and 23, respectively, then by moving in unison the movable contacts 14 and 15 along their associated resistors, the movable contact 14 will be moved to the negative pole side from the positive pole side of the D.C. source 11 whereas the movable contact 15 will be moved to the positive pole side from the negative pole side. As a result the voltage supplied to the input terminals 32 and 32' will vary as shown by a dotted line in FIG. 2 as the movable contacts are moved, but as will be clearly understood from the curve the output voltage will assume a value smaller than any one of the set values $E_1$ and $E_2$ while it is varied so that the output voltage does not change linearly. Thus, such output voltage can not be advantageously used in dimmer control.

As already mentioned above the feature of this invention is to provide an output voltage which varies smoothly and linearly.

Figure 3:
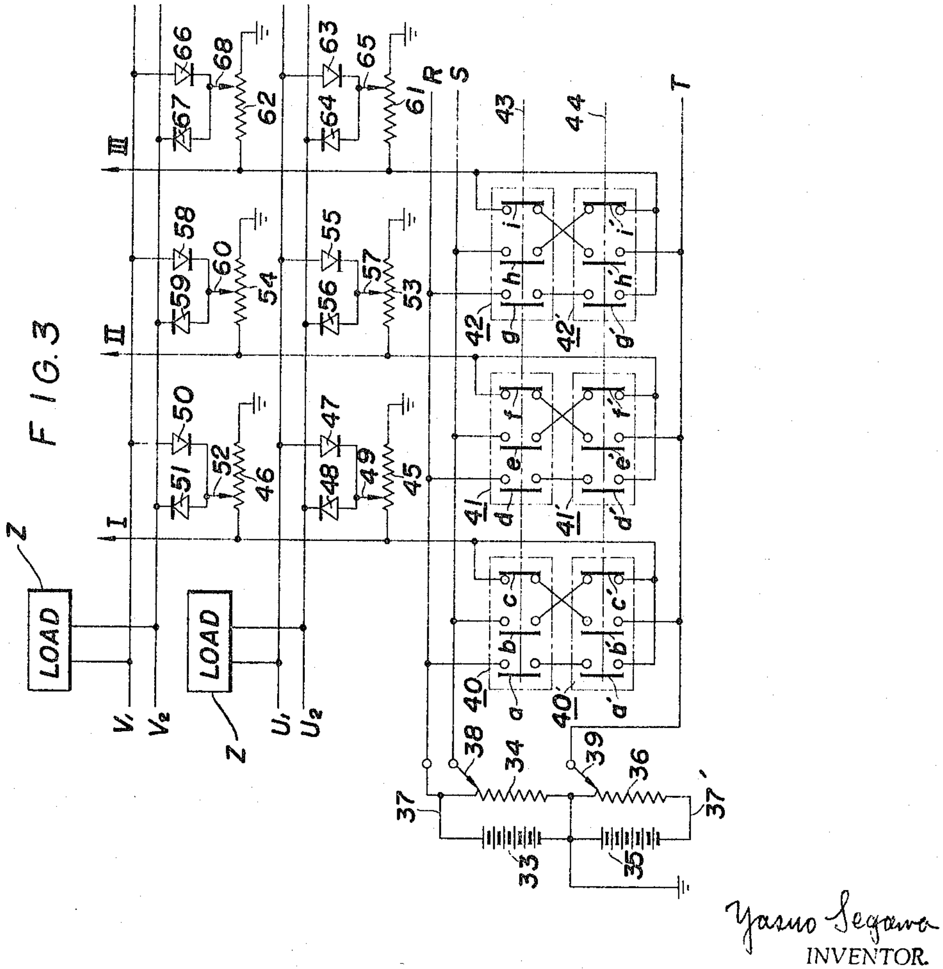
FIG. 3 shows an electrical connection diagram for one embodiment of this invention.

Referring now to FIG. 3 there is shown one embodiment of this invention comprising a pair of serially connected sources of direct currents 33 and 35, a first variable resistance 34 being connected in parallel with the source 33 while a second variable resistance 36 in parallel with the source 35. According to this invention three D.C. source busses R, S and T are provided. The first bus R is to be connected to either one of the outer terminals 37 and 37' of the serially connected sources of direct currents 33 and 35. In the case shown, the first D.C. source bus R is connected to the positive terminal 37 of the D.C. source 33. The second D.C. source bus S is supplied with the output voltage of the slidable arm 38 of the first variable resistor 34 while the third D.C. source bus T is supplied with the output voltage of the slidable arm 39 of the second variable resistor 36.

In order to selectively derive a D.C. signal voltage from the three D.C. source busses R, S and T, according to this invention a plurality of switching mechanisms are connected between busses R, S and T, each including a combination of two switches, each having three contacts. In the embodiment shown, there are employed three pairs of switches 40, 40', 41, 41' and 42, 42'. Referring now more particularly to switch pairs 40 and 40' their contacts *a*, *a'*, *b*, and *b'* are of the normally opened type, while contacts *c* and *c'* are of the normally closed type. Each of the switches 40 and 40' is constructed to simultaneously operated its three contacts. One end of the contacts *a*, *b* and *b'* is respectively connected to the D.C. source busses R, S and T. One end of the contacts *a'*, *c* and *c'* is respectively connected to the bus I of the D.C. signal whereas contacts *a* and *a'*, *b* and *c'* and *c* and *b'* are respectively connected in series. Thus the voltage of the first bus bar R will be derived through contacts *a* and $a'$, the voltage of the second bus bar S through contacts $b$ and $c'$ and the voltage of the third bus bar T through contacts $b'$ and $c$. It will be obvious that these voltages are selected to be supplied to the D.C. signal bus I.

The other pairs of switches 41, 41' and 42, 42' are similarly constructed so that the voltage of the first D.C. source bus R is obtained through contacts $d$ and $d'$ and contacts $g$ and $g'$, the voltage of the second D.C. source bus S through contacts $e$ and $f'$ and $h$ and $i'$ and the voltage of the third D.C. source bus T through contacts $e'$ and $f$ and $h'$ and $i$, respectively. Thus the voltages which are selectively obtained by the operation of switch pairs 41 and 41' are supplied to bus II of the D.C. signal bus while the voltages selectively obtained by the operation of switch pair 42, 42' are supplied to the bus III of the D.C. signal. As shown by dot and dash lines 43 and 44, sets of switches 40, 41, 42 and 40', 41' and 42' are so interrelated that when any one switch of each set is actuated the remaining switches belonging to the same set are automatically rendered inoperative.

Any desired number of variable resistors adapted to preset the desired level of D.C. signals may be connected to each of the D.C. signal busses with their slidable arms connected to a pair of D.C. level control busses via a pair of rectifier elements. With reference in particular to D.C. signal bus I, one end of a pair of variable resistors 45 and 46 adapted to preset the signal level is connected to this bus I while the other end of the variable resistors 45 and 46 is connected to the common junction between said D.C. sources 33 and 35. A pair of D.C. level control busses $U_1$ and $U_2$ are connected to the slidable arm 49 of a variable resistor 45 adapted to preset the level through two rectifier elements, such as diodes 47 and 48 which are oppositely poled. Similarly another pair of D.C. level control busses $V_1$ and $V_2$ are connected to the slidable arm 52 of the other level presetting variable resistor 46 through a pair of rectifier elements likewise oppositely poled. The load Z such as an incandescent lamp to be dimmed by controlling the voltage supplied is supplied and connected between each pair of D.C. level control busses $V_1$, $V_2$, and $U_1$, $U_2$. Other D.C. signal busses II and III are similarly connected to one terminal of level presetting variable resistors 53, 54 and 61, 62 the other end of these resistors being connected to said common junction of the D.C. sources 33 and 35. In the embodiment illustrated, D.C. level control busses $U_1$ and $U_2$ are connected to slidable arms 57 and 65 through pairs of oppositely poled rectifier elements 55, 56 and 63, 64, and another pair of D.C. level control busses $V_1$ and $V_2$ are similarly connected to slidable arms 60 and 68 respectively through pairs of oppositely poled rectifier elements 58, 59 and 66, 67 as shown in FIGURE 3.

Figure 4:
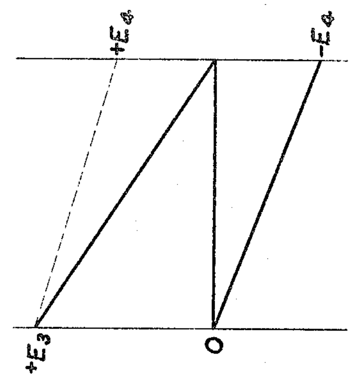
FIG. 4 shows voltage curves to illustrate the gradually changing property of the D.C. signal level in the circuit of this invention.

Let us first consider that it is desired to gradually vary the level of D.C. voltage by means of the circuit arrangement shown in FIG. 3. Then the level presetting variable resistors 45 and 46 are adjusted to provide a positive voltage $E_3$ as shown in FIGURE 4. In order to gradually change from the voltage $E_3$ to $E_4$ across the load the switch 40 in the set 43 shown by dot and dash line 43 and the switch 41' in the other set shown by dot and dash line 44 are actuated, and slidable arms 38 and 39 are then moved in unison from the positive pole side to the negative pole side.

Current flows from the slidable arm 38 to the parallel variable resistors 45 and 46 through the second D.C. bus S, closed contact $b$ of the switch 40, normally closed contact $c'$ of the switch 40' and D.C. signal bus I. Voltage $E_3$ established by adjusting variable resistor 45 is maintained by three circuits, namely, the first circuit of three circuits including slidable arm 49, rectifier element 48 and D.C. level control bus $U_2$; the second circuit, which includes D.C. level control bus $U_1$, rectifier element 55, slidable arm 57 and variable resistor 53; the third circuit which also has D.C. level control bus $U_1$, rectifier element 63, slidable arm 65 and variable resistor 61. Similarly, with regard to the variable resistor 46, the D.C. level control busses $V_1$ and $V_2$ are maintained at voltage $E_3$.

Also the current from slidable arm 39 flows to parallel variable resistors 53 and 54 through third D.C. source bus T, closed contact $e'$ of the switch 41', normally closed contact $f$ of the switch 41 and D.C. signal bus II. Similarly, the voltage $E_4$ established by adjusting the variable resistor 53 is maintained by three circuits. In this case, the first circuit of said three circuits includes the slidable arm 57, rectifier element 56 and D.C. level control bus $U_2$. Next, the second circuit includes D.C. level control bus $U_1$, the rectifier element 47, the slidable arm 49 and the variable resistor 45. The third circuit also has D.C. level control bus $U_1$, rectifier element 63, slidable arm 65 and variable resistor 61. Similarly, with respect to variable resistor 54 the D.C. level control busses $V_1$ and $V_2$ are maintained at voltage $E_4$.

FIGURE 4 shows the resultant voltage $E_3$ to $E_4$ across the load. If it is assumed that the potential at the junction between D.C. sources 33 and 35 is zero, then the voltage which is set by the variable resistors 45 and 46 will change linearly from $+E_3$ to zero as the movable arm 38 is moved and the voltage set by the variable resistors 53 and 54 will change linearly from zero to $-E_4$. Accordingly the sum of the absolute values of both voltages will appear as the voltage of the D.C. level control bus which will change linearly from $+E_3$ to $+E_4$ as indicated by a broken line.

In order to rapidly change the level when only one of the second and third D.C. source busses S and T, for example the second D.C. source bus S is supplied with voltage, it is necessary to change the setting of the gang of switches in set 43 shown by the dot and dash line. Since this set will switch from one D.C. signal bus to the other D.C. signal bus, the level setting voltages will be changed and effect a rapid change of levels. When the third D.C. source bus T is supplied with voltage, a similar rapid change can be effected by changing the switch operated in the set 44 as shown by the dot and dash line. Similarly in order to quickly remove the level, instead of changing the switch operated to rapidly change the level as above described the switch operated in the set is released, and in order to gradually provide or gradually remove the level it is necessary to operate slidable arms 38 or 39 separately. Rapid and gradual changes provided by the above described operations may be advantageously used to effect "cut in" and "cut off" as well as "fade in" and "fade out" in the dimmer control for the incandescent lamps.

In order to gradually remove the level after changing it with the same D.C. signal bus by switching the output voltages of the D.C. source busses S and T, the following sequence of operations is required.

For example when the switch 41 is actuated to set a certain level by means of variable resistors 53 and 54 through the D.C. signal bus II, if the switch 41' is actuated while maintaining switch 41 in the actuated state, then the voltage of the bus S will be interrupted by the opening of the contact $f'$ while at the same time the voltage of the bus R will be supplied to the D.C. signal bus II through the contact $d'$ now closed. The level given by the bus T can be gradually removed by moving the movable arm 39 toward the negative pole side after the switch 41 has been released to interrupt the voltage of bus R and simultaneously to apply the voltage of the bus T to the D.C. signal bus II through contacts $e'$ and $f$.

Figure 5:
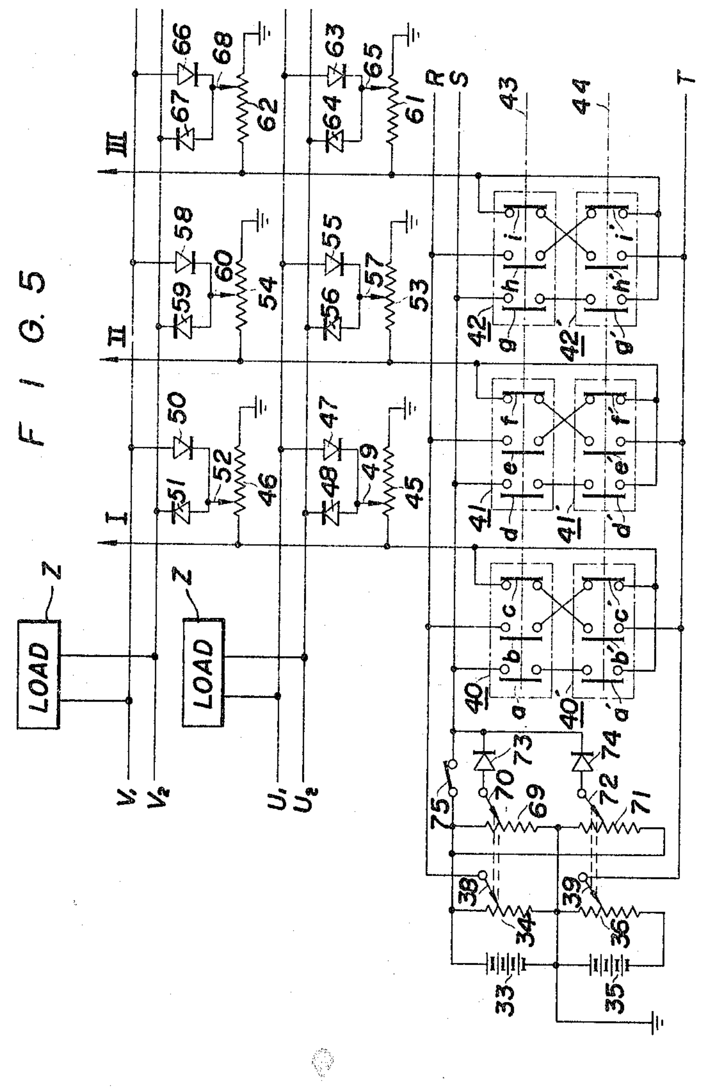
FIG. 5 shows another embodiment of this invention.

While in the above described sequence of operations switch 41 was released in order to provide switching between D.C. source busses S and T, in a modification shown in FIG. 5 the same function can be achieved by the same operation as above described without releasing the switch 41. Corresponding components of FIGS. 3 and 5 are designated by the same reference numerals. In FIG. 5 a third variable resistor 69 is connected in parallel with the first variable resistor 34 and its movable arm 70 is interlocked with the movable arm 38 of first variable resistor 34. Also a fourth variable resistor 72 is connected in parallel with the first variable resistor 34 with its movable arm 72 interlocked with the movable arm of the second variable resistor 39. Movable arms 70 and 72 are respectively connected to rectifier elements 73 and 74 and a switch 75 is provided to supply the combined outputs of these rectifier elements to the first D.C. source bus S instead of supplying any terminal voltage other than that of the common junction between said two D.C. sources which are connected in series. The purpose of employing rectifier elements 73 and 74 is to prevent a short circuit which may be caused by the movable arms 70 and 72. In order to gradually remove the level after changing it by switching the output voltages of the second and third D.C. source busses S and T with the switch sets the following operation must takes place. If it is assumed that the voltage of the D.C. signal bus II is to be utilized as in the previous example, switch 41 is actuated while maintaining switch 41' in its actuated state, then the switch 75 is opened and finally movable arms 38 and 70 are moved in unison from the positive pole side to the negative pole side.

If the switch 75 is maintained closed the circuit, shown in FIG. 5 can be operated in the same manner as in FIG. 3. This is because when the switch 75 is closed the output voltage from the D.C. source 33 is supplied to the first D.C. source bus S under short circuit condition so that it is not affected by the combined output from the movable arms 70 and 72.

Furthermore, by using the circuit of FIG. 5 it is possible to shift the operation of the switch sets from set 44 to set 43. In this case slidable arms 38 and 70 and slidable arms 39 and 72 are moved in unison from the negative pole side to the positive pole side of the D.C. source while the switch 75 is maintained closed.

While certain particular examples of multiple stage D.C. signal control devices of this invention have been disclosed for purpose of illustration and description, it is to be understood that various changes can be made therein without departing from the spirit and scope of the invention, whereby it is intended to cover in the appended claims all such modifications as fall within the true spirit and scope of the invention.

What is claimed is:

1. A multiple stage D.C. signal control device comprising, a first D.C. source including terminals, a first variable resistor with a slidable arm connected in parallel with said first D.C. source, a second D.C. source including terminals and a common junction so that said second D.C. source is connected in series with said first D.C. source, a second variable resistor with a slidable arm connected in parallel with said second D.C. source, a first D.C. source bus supplied with the output voltage of any one of the terminals of said first and second D.C. sources other than said common junction, a second D.C. source bus supplied with the output voltage of the slidable arm of said first variable resistor, a third D.C. source bus supplied with the output voltage of the slidable arm of said second variable resistor, a plurality of D.C. signal busses to be selectively supplied with the output voltage of the D.C. source busses, two sets of three gang switches, each gang including three pairs of switches, each gang having a set of three contacts closing the switches, connected in cascade for supplying said source busses output voltages to said signal busses, a plurality of level setting variable resistors each having a sliding arm one end of each of said level setting variable resistors being connected to a selected one of said D.C. signal busses and the other end being connected to said common junction between said two D.C. sources and a pair of D.C. level control busses, a pair of oppositely poled rectifier elements for each level setting variable resistor, said pairs of rectifier elements serving to connect said level setting variable resistors sliding arms to said level control busses across which busses an output load can be connected.

2. The multiple stage D.C. signal control device according to claim 1 which further comprises a third variable resistor and slidable arm which is connected in parallel with said first variable resistor, means to interlock the slidable arms of said first and third variable resistors, a fourth variable resistor and slidable arm which is connected in parallel with said first variable resistor, means to interlock the slidable arms of said second and fourth variable resistors and switching means to apply to said first D.C. source bus a combined output of the slidable arms of said third and fourth variable resistors.

3. The multiple stage D.C. signal control device according to claim 1 wherein each of said gang switches includes first and second contacts of normally opened type and a third contact of normally closed type, the first D.C. source bus being connected to the selected one of said D.C. signal busses through the first contact of the first switch gang and the first contact of the second switch gang, the second D.C. source bus being connected to the selected one of said D.C. signal busses through the second contact of said first switch gang and the third contact of said second switch gang and the third D.C. source bus being connected to the selected one of said D.C. signal busses through the third contact of said first switch gang and the second contact of said second switch gang.

References Cited by the Examiner

UNITED STATES PATENTS

| | | | |
|---|---|---|---|
| 2,529,989 | 11/1950 | Arvidsson | 315—293 |
| 3,040,575 | 6/1962 | Sable | 323—74 |

JOHN F. COUCH, *Primary Examiner.*

LLOYD McCOLLUM, *Examiner.*

A. D. PELLINEN, *Assistant Examiner.*